United States Patent
Schoen

(10) Patent No.: US 6,680,480 B2
(45) Date of Patent: Jan. 20, 2004

(54) LASER ACCELERATOR PRODUCED COLLIDING ION BEAMS FUSION DEVICE

(76) Inventor: Neil C. Schoen, 9817 Freestate Pl., Gaithersburg, MD (US) 20886

(*) Notice: Subject to any disclaimer, the term of this patent is extended or adjusted under 35 U.S.C. 154(b) by 222 days.

(21) Appl. No.: 09/987,209

(22) Filed: Nov. 14, 2001

(65) Prior Publication Data

US 2002/0181655 A1 Dec. 5, 2002

Related U.S. Application Data

(60) Provisional application No. 60/252,325, filed on Nov. 22, 2000.

(51) Int. Cl.[7] .............. H01J 49/06; H01S 3/00
(52) U.S. Cl. ........... 250/423 R; 250/427; 250/398; 250/505.1; 376/127; 376/107; 376/108
(58) Field of Search ............. 250/423 R, 427, 250/398, 505.1; 376/127, 108, 107

(56) References Cited

U.S. PATENT DOCUMENTS

| | | | |
|---|---|---|---|
| 4,570,103 A | * | 2/1986 | Schoen ............ 315/5.41 |
| 6,061,379 A | * | 5/2000 | Schoen ............ 372/76 |
| 6,333,966 B1 | * | 12/2001 | Schoen ............ 378/119 |

OTHER PUBLICATIONS

Shvets et al., Acceleration and Compression of Charged Particle Bunches using Counterpropagating Laser Beams, (IEEE Transactions on Plasma Science, vol. 28, No. 4, Aug. 2000, pp 1185–1192).*

\* cited by examiner

Primary Examiner—Nikita Wells

(57) ABSTRACT

A fusion device consisting of two colliding ion beams, each produced by a high power, femtosecond regime, chirped pulsed amplification (CPA) laser acceleration device. The CPA laser creates an ionized plasma and subsequently accelerates electrons to multi-MeV energies, thus creating electric fields due to separation of electrons and ions, of sufficient magnitude to accelerate the plasma ions to energies ranging from multi-keV to multi-MeV levels. The magnetic fields created by the laser pulses, as well as the electrons and/or ions, also helps confine the ions to the region of the size of the laser beam focal spot diameter, and thus enhance the collision probability of the counter-streaming ions and provide a sizable population of fusion events. Ion beam generation by high powered, short pulse CPA lasers has been previously demonstrated in thin foil targets. This novel use of the colliding beam geometry should lead to near break-even levels of fusion energy production in compact geometry suitable for small laboratory use for weapons design applications and commercial fusion energy characterization emulations. In addition, the low emittance of any radiation produced in the small fusion reaction region could provide a significant feature for use of this technology in high resolution neutron radiography, or other commercial or medical applications of neutrons, ions, electrons or photons (5) produced by components of this technology. It should be noted that the ion beam(s) created with only one foil target could produce neutrons for radiography by other than fusion reactions; for example for protons, (p,n) reactions on the target atoms will produce a neutron source of varying energies, although the cross sections for the reactions may be somewhat lower than for fusion.

11 Claims, 1 Drawing Sheet

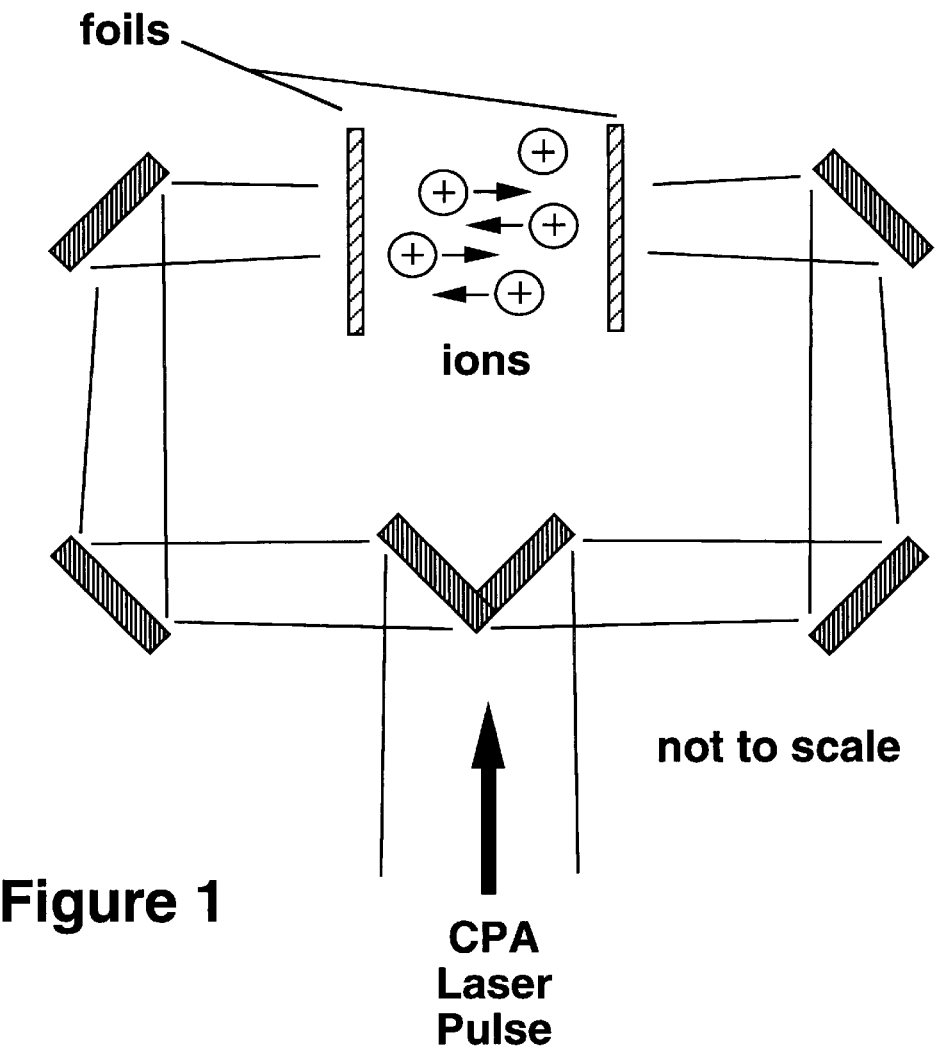
Figure 1
CPA Laser Pulse
Figure 2
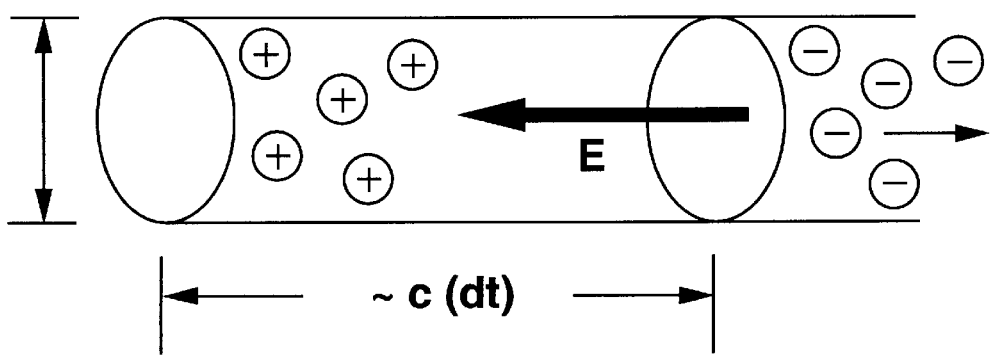

LASER ACCELERATOR PRODUCED COLLIDING ION BEAMS FUSION DEVICE

This application claims the benefit of U.S. Provisional Application No. 60/252,325 filed on Nov. 22, 2000.

BACKGROUND OF THE INVENTION

Laser acceleration of electrons to multi-Mev energies has been demonstrated theoretically (1) and experimentally (2,3) within the last twenty years. Most recently, the first use of laser accelerated electrons to produce multi-MeV ion beams has been experimentally observed (4) by a number of laboratories in the U.S. and the U.K. The Department of Energy Laboratories, under the national Laser Fusion Program, utilizes a technique known as inertial confinement. This requires an enormous laser device, with a large number multiple beams to produce a relatively uniform implosion reaction at the surface of a fusion pellet target to produce the required compression to ignite a fusion reaction at the pellet fuel core. The only other fusion alternative has been the long running magnetic confinement fusion program, that has spanned over fifty years. Both programs require huge expenditures and large facilities to produce any fusion reactions.

The present invention offers the potential of creating a significant level of fusion reactions (of the order of 10e+12 reactions per pulse) within a laboratory setting typically found in many university laboratories, which would require minimal space, and expenditures in the hundreds of thousands of dollars as opposed to the hundreds of millions of dollars spent on the national facilities. It is also possible to produce fusion reactions using a single ion beam by using a single foil composed of one of the fusion reactants, backed by a second solid or gaseous medium composed of the second fusion atom reactant species. Colliding beams produce fusion reactions at lower beam energies than stationary target configurations.

SUMMARY OF THE INVENTION

The major component of this invention is a high powered, short pulse, chirped pulse amplification laser system. Typical parameters required to create the electron acceleration levels necessary to pull ions to levels required in fusion reactions are; pulse energies of the order of 0.5 Joule, pulse widths of several hundred femtoseconds or less, and focal spot diameters of the order of a few microns. This combination should produce the requisite energy densities of greater than 10e+18 watts/cm² necessary to create the electric field strengths required to ionize gas or foil targets and then accelerate the electrons ejected from the atoms to multi-Mev energies. At incident energy densities of this level, the laser beam can create an ionization channel that might extend from several hundred microns to the order of a centimeter, due to self-focusing and/or channeling mechanisms.

The novel configuration that allows fusion energy production, not possible in a typical black-body plasma that could be created by this amount of energy density, is the colliding beam geometry that provides the maximum center of mass energy for fusion reactions. Uniform plasma configurations have to deal with both ion-ion and ion-electron collisions, and an optimal collision geometry does not always exist in these black-body plasmas. The colliding beams can be produced by splitting the laser accelerator pulse into two beams, and using turning mirrors and separate focusing optics to create counter-propagating laser pulses. Alignment, although required to be accurate to the order of a micron, should be feasible with current technology.

Recent experiments have used solid foil targets to create the ion beams, which exit from the rear of the foil. This configuration probably allows the ions to be accelerated without the return of electrons to slow down the ions after the end of the laser pulse, since the electrons' fields are likely "shorted out" by the back plane of the target foils. An alternative configuration may be possible using pulsed gas targets, with additional foils to create similar electrostatic environments. Gas targets can have channels as long as a centimeter, whereas foil targets are typically of the order of tens of microns. In order to stabilize long channels in gas targets, it may be possible to utilize a capillary waveguide to create a more uniform ionized channel region. These capillary waveguides (of the order of tens of microns or more in diameter) can also be used to alter the effective index of refraction of the channel medium, and hence the laser field phase/group velocity, which may be useful for x-ray production applications where timing adjustments to synchronize spontaneous emission is necessary.

The number of ions accelerated will depend on the relative densities of the targets; ratios of solids to gas densities are typically of the order of 10e+4 and thus the relative thicknesses of gas and solid targets should be of the order of this ratio. Pulsed magnetic fields of the order of a few megagauss (which could be obtained from a lower powered laser pulse, polarized and directed normal to the ion direction) could contain the ion beams over reasonable foil separation distances, but having the two foils in close proximity (of the order of 30 microns) would be much simpler and more energy efficient, given the 30 degree beam divergences reported for the ion beams in the literature.

DESCRIPTION OF THE DRAWINGS

FIG. 1. shows a configuration utilizing a single laser with split beams, which could lower costs and make alignment easier than using two separate lasers.

FIG. 2. shows target configurations for foils and gas targets, as well as the expected electron-ion displacement geometry.

DETAILED DESCRIPTION PREFERRED EMBODIMENTS

The following cited references will provide background technical information upon which the technical analyses in subsequent paragraphs is based, thus obviating the need to reproduce the material herein. The physics of the laser acceleration of electrons, along with computer simulations, is provided in U.S. Pat. No. 4,570,103 (N. C. Schoen). The use of femtosecond lasers and foil targets in the production of x-rays from laser accelerated electrons is described in U.S. Pat. Nos. 6,061,379 and B 6,333,966 B1 (both by N. C. Schoen).

The following calculations, in conjunction with the figures, will provide the necessary technical detail that represents the description of preferred embodiments. First, the magnitude of the magnetic field produced by the laser pulse is estimated to determine the effect on the geometrical divergence of the accelerated ions. The relationship $E_m$=c $B_m$ can be used to calculate the transverse magnetic field of the laser pulse. Using an electric field value of $E_m$=10e+13 v/meter, which produces a power level of the order of 10e+20 w/sq cm (assuming spot sizes of the order of 1–3 microns diameter), the resultant magnetic field is $B_m$=3.3× 10e+4 wbr/sq m, or about 330 megagauss.

The ion radius in such a magnetic field can be calculated as $$r_i = m\ v/(q\ B) \text{ where the velocity } v = \sqrt{\frac{2K.E.}{m}}$$

where K.E. is the kinetic energy of the ion. For example purposes, if we assume an ion kinetic energy of 1 MeV then $$v = \sqrt{\frac{2 \times 1 \times 1.6e-19}{1.67 \times e-27}}$$

which yields v=1.38×10e+4 m/sec.

The ion radius $r_i$ is then =10e−7 or about 0.1 micron. To confine the ion with an external field to the laser spot diameter of a few microns, the field would need to approach 10 megagauss. The ion rotation frequency in the stronger laser field is approximately f=qB/(2πm), which yields a period of about 2×10e−12 seconds.

The ion density produced in the laser-ionized channel can be estimated as follows. The ion density ID can be written as $$ID = \frac{N_0 \rho}{A}$$

for a one square cm cross-section area

If the target density is assumed to be 10e−4 g/cubic cm for a gas with A=3, then the ion density is ID=2×10e+19. The ion number can be found by multiplying ID by the channel length t and the ratio of the channel area to the 1 square cm reference area. This yields for the number of ions I $$I=ID \times t \times \pi (1.5 \times 10e-6)^2/(10e-2)^2$$

so the ion number can be I=2×10e+12 ions. The total charge of these ions can be written as Ix(e), where e is the electronic charge constant.

If a like number of ions collide, the number of fusion reactions can be written as $$N_{fuse} = I \times \sigma_{D-T} \times I_t \text{ (where } I_t \text{ is the ions per sq cm)}$$

where the D-T cross-section is obtained from the NRL Plasma Formulary as 4×10e−22. The fraction f of ions undergoing fusion can thus be estimated to be f=$N_{fuse}/I_t$= 1.6e×10e+10/(2×10e+12) or about 1% of the total produced.

The energy produced by these reacting ions can be estimated using a 14 MeV fusion energy release for D-T reactions (also from NRL handbook)

$$E_{out}=2 \times 10e+12(0.01) \times 14 \times 10e+7 \times 1.6 \times 10e-19$$

which yields $E_{out}$=0.5 Joule or 500 milliJoules. If we assume that the laser is 5% efficient, then the energy needed from the fusion reactions has to be about 20 times that of the energy in the laser pulse. This yields a laser pulse power necessary of about 25 milliJoules. Current systems can produce accelerated ion beams using about 250 milliJoules. Thus, this particular example is about 10 times below break-even. It is anticipated that some improvements can be made in the laser efficiencies to begin to approach break-even.

Finally, one can estimate the maximum ion energies based on the number of electron/ion pairs created and the charge separation created by the strong laser electric field acceleration of the electrons. The following formulas can be used:

$$V_{ion} = \frac{q}{4\pi\varepsilon_0 d}$$

where V is the accelerating voltage created and d is the charge separation, which can be estimated as simply the speed of light c times the laser pulse length dt (this assumes the electrons are quickly accelerated to close to the speed of light before the laser pulse is over). Again, q=I e where e is the electronic charge. Using the previous quantities and assuming dt=100 femtoseconds, then the maximum ion energy is about 95 MeV. This number compares to the measurements reported in the literature of about 40 MeV, using helium-like targets. Higher energies are achieved with heavier ions. One can also try to estimate the ion energies using an analogy with a capacitor. Here, the formula is $$C = \varepsilon_0 \frac{E}{d}$$

where again d=c dt and then $V_{ion}$=q/C. This approximation yields numbers up to an order of magnitude higher than the simple calculation of the voltage of the ion cluster at the separation distance of the electrons.

REFERENCES

1. N. C. Schoen, "Transverse Acceleration of Electrons Using Laser or Maser Drivers", Applied Physics Letters 44, 386 (1984).
   N. C. Schoen, "Particle Beam Accelerator", U.S. Pat. No. 4,570,103.
2. G. Malka, E. Lefebvre and J. L. Miquel, "Experimental Observation Of Electrons Accelerated In Vacuum To Relativistic Energies By A High Intensity Laser", Physical Review Letters, Vol. 78, No. 17, pg. 3314, 28 April, 1997.
3. G. Malka et. al., "Suprathermal Electron Generation And Channel Formation By An Ultra-Relativistic Laser Pulse In An Underdense Preformed Plasma", Physical Review Letters, Vol. 79, No. 11, 15 September 1997.
4. November 1999 Meeting of the American Physical Society Plasma Physics Division papers on laser accelerated ion production:
   Lawrence Livermore National Laboratory, Petawatt Laser Facility reported 50 MeV protons
   Imperial College at the University of London, U. K., Vulcan Laser Facility reported 30 MeV protons and 420 MeV lead ions.
5. N. C. Schoen, "Laser Accelerator Femtosecond X-Ray Source", U.S. patent application Ser. No. 09/135,164, and "Pulsed X-ray Laser Amplifier", U.S. Pat. No. 6,061,379.

What is claimed is:

1. A laser accelerator produced multiple ion beam device for generation of fusion reactions, trans-Uranium isotopes and production of low emittance neutron, proton, and x-ray radiography sources, comprising:
   femotosecond regime laser means to produce micron regime sized focal spots with power densities sufficient to produce ionized target electrons and accelerate them to multi-MeV energies suitable for use for ion structure;
   ion acceleration means generated by said femtosecond regime laser means which provides the strong laser electric field acceleration of said ionized target electrons, which then produces the charge separation between said accelerated ionized target electrons and stationary ions, which results in acceleration of said stationary ions to said multi-MeV energies;
   multiple target means with vacuum chamber to provide sources of said ionized atoms and electrons by said laser means to allow multi-MeV electromagnetic fields to be produced and accelerate counter-propagating ions in said multiple target means to said multi-MeV energies, and;

beam alignment means to allow for the interaction of said counter-propagating ions from said multiple target means necessary for fusion, isotope generation, and production of low emittance beams for radiography.

2. A device according to claim 1 in which said femtosecond regime laser means consists of a single chirped pulse amplification (CPA) to produce laser power densities in excess of 10e+18 w/cm$^2$ with micron regime cross-sections at the focal plane and said beam alignment means comprises optical beam splitters and mirrors to create two separate counter propagating laser beams and align them to near micron accuracy to produce said counter-propagating ion beams.

3. A device according to claim 1 in which said femtosecond regime laser means consists of two separate chirped pulse amplification (CPA) lasers to produce laser power densities in excess of 10e+18 w/cm$^2$ with micron regime cross-section at the focal plane and said beam alignment means comprises optical beam mirrors to align two separate counter propagating laser beams to near micron accuracy to allow collision of said counter-propagating ion beams.

4. A device according to claim 1 in which said target means to provide a source of said ionized electrons and ions for acceleration is selected from the group comprising; solid foil targets, high density pulsed gaseous targets, and capillary wave guide enclosed gaseous targets.

5. A laser accelerator produced electron beam device for generation of fusion reactions, trans-Uranium isotopes and production of low emittance neutron, proton, and x-ray radiography sources, comprising;

femtosecond regime counter-propagating laser means to produce micron regime sized focal spots with power densities sufficient to produce ionized target electrons and accelerate them to multi-MeV energies suitable for use for ion acceleration;

ion acceleration means generated by said femtosecond regime laser means which provides the strong laser electric field acceleration of said ionized target electrons, which then produces the charge separation between said accelerated ionized target electrons and stationary ions, which results in acceleration of said stationary ions to said multi-MeV energies;

first target means with vacuum chamber to provide a source of said ionized atoms and electrons by said laser means to allow multi-MeV electromagnetic fields produced to accelerate ions in said target means to said multi-MeV energies;

second stationary target means to provide ionized target atoms by said laser means for accelerated ion beams produced in said first target means, and;

beam alignment means to allow for the interaction of said multi-MeV ion beam with said second target necessary for fusion, isotope generation, and production of low emittance beams for radiography.

6. A device according to claim 5 in which said single ion beam collides with said second stationary target means selected from the group comprised of an ionized gaseous target and a solid target, of different atomic number than that of the ion beam.

7. A device according to claim 5 in which said second stationary target is an ionized target created with a second femtosecond regime laser beam to provide both the stationary ionized target atoms species and a strong magnetic field to confine the spreading of the entering ion beam.

8. A device according to claim 5 in which said target means to provide a source of said ionized electrons and ions for acceleration is selected from the group comprising; solid foil targets, high density pulsed gaseous targets, and capillary wave guide enclosed gaseous targets.

9. A device according to claim 5 in which (p,n) reactions are used to produce a beam for neutron radiography using a single hydrogen ion beam impinging on a second stationary target with atoms or ions suitable for high cross-section production of neutrons.

10. A device according to claim 5 wherein said multi-MeV energies accelerated ionized target electrons are produced in a capillary wave guide enclosed gaseous target, and the unaccelerated ions become the second target for said multi-MeV energies electrons to produce a low emittance Bremstrahlung x-ray source with coherence tuned in part by altering the phase velocity in said capillary wave guide enclosed gaseous target.

11. A device according to claim 5 wherein said first target and second stationary target are a combined foil sandwhich consisting of two fusion reactants foils with a thin metallic center foil, allowing accelerated ions produced in the first fusion reactant foil to exit through the thin metallic center foil and react with the second fusion reactant foil ions to produce a low emittance fusion source.

* * * * *